United States Patent [19]

Yamaguchi et al.

[11] Patent Number: 5,162,685
[45] Date of Patent: Nov. 10, 1992

[54] ROTOR FOR A REVOLVING-FIELD TYPE MOTOR

[75] Inventors: Yasuo Yamaguchi, Kariya; Yutaka Hotta, Chiryu, both of Japan

[73] Assignee: Aisin AW Co., Ltd., Japan

[21] Appl. No.: 709,984

[22] Filed: Jun. 4, 1991

[30] Foreign Application Priority Data

Nov. 20, 1990 [JP] Japan .................. 2-314917

[51] Int. Cl.⁵ .................................... H02K 21/12
[52] U.S. Cl. ........................... 310/156; 310/271
[58] Field of Search ............ 310/156, 261, 154, 42, 310/271

[56] References Cited

U.S. PATENT DOCUMENTS

| | | | |
|---|---|---|---|
| 4,535,263 | 8/1985 | Avery | 310/156 |
| 4,642,502 | 2/1987 | Carpenter et al. | 310/156 |
| 4,674,178 | 6/1987 | Patel | 310/156 |
| 4,713,569 | 12/1987 | Schwartz | 310/156 |
| 4,714,852 | 12/1987 | Kawada et al. | 310/156 |

Primary Examiner—R. Skudy
Attorney, Agent, or Firm—Lorusso & Loud

[57] ABSTRACT

A revolving-flux type motor is provided with a stator including a coil wound around an iron core and a rotor including permanent magnets fixed to an iron core. The permanent magnets of the rotor have peripheries which form a circle as a whole when fixed to the iron core and bottoms of which configurations are determined to form a flux density distribution of a sinusoidal waveform at a gap between the stator and the rotor. The iron core of the rotor has an outer peripheral configuration which allows face-contact with the bottoms of the permanent magnets.

2 Claims, 9 Drawing Sheets

ROTOR FOR A REVOLVING-FIELD TYPE MOTOR

BACKGROUND OF THE INVENTION

1. Field of the Invention

The present invention relates to a revolving-flux type motor provided with a stator which includes a coil wound around an iron core and a rotor which includes permanent magnets fixed to an iron core.

2. Description of the Prior Art

FIGS. 5(a) and 5(b) illustrates a rotor for a revolving-flux type motor of the prior art, and FIGS. 6(a), 6(b) and 6(c) illustrate structures for fixing permanent magnets using a holder band.

In the rotor for a revolving-flux type motor provided with a stator including a coil wound around an iron core and a rotor including permanent magnets fixed to an iron core, each permanent magnet attached to the rotor is generally of an arcuate shape. If the magnet has a uniform thickness, i.e. uniform thickness radially of the rotor, the distribution of magnetic flux density at the gap between the stator and the rotor forms a square waveform so that the efficiency of the motor is reduced due to the influence of harmonic components exceeding the fundamental wave of a sinusoidal waveform.

In order to obtain the flux density distribution of a sinusoidal waveform, corner portions of the arc-shaped permanent magnets are cut or recessed in the prior art, or, as shown in FIG. 5(a), permanent magnets 82 having eccentric outer peripheries are fixed to a cylindrical rotor iron core 81 so as to form a magnetic circuit as shown in FIG. 5(b). In this manner, the flux density distribution at the gap 85 between the permanent magnets 82 and the iron core 83 of the stator has a sinusoidal waveform in the lateral direction of the permanent magnets.

High speed motors generally employ band clamps for fixing permanent magnets to the iron cores of the rotors, an example of which is illustrated in FIGS. 6(a), 6(b) and 6(c) which are top, elevation and cross-section views, respectively.

As shown in FIGS. 6(a), 6(b) and 6(c), a band clamp device includes an endless band 86 formed of a cylindrical sheet, retainers 87 for tightening the band 86 at spaces between the permanent magnets 82 and screws for fixing the retainers 87 to the iron core 81 of the rotor. For fixing the permanent magnets 82 to the iron core 81, the permanent magnets 82 are initially positioned and aligned on the outer periphery of the iron core 81, and are covered with the band 86. Then, the retainers 87 are located on portions of the band 86 over the joints between the permanent magnets 82 and are fastened to the iron core 81 by the screws 88, so that the band 86 and the retainers 87 are moved into the joints between the permanent magnets 82 to fix the permanent magnets 82.

However, the above described manner of using a band clamp to fix the permanent magnets 82 to the iron core 81 requires time-consuming operations to locate the permanent magnets and fix them with the band clamp, so that productivity is low.

In order to eliminate these time-consuming operations and to increase productivity, automatic assembling of the permanent magnets on the iron core by an endless band clamp has been proposed. However, if the permanent magnets have cut or recessed corners or eccentric outer peripheries, the band clamp cannot have a simple cylindrical form and, therefore, fitting the band on the rotor becomes difficult. Further, this approach also reduces contact area between the permanent magnets and the band, so that particularly large loads must be applied to portions of the band contacting the magnets and thus the tightening effect is reduced.

It is an object of the invention to provide a design overcoming the above-noted problems, which design enables automatic assembling of the permanent magnets by use of a band clamp. It is another object of the invention to tightly fix the permanent magnets with a sufficiently large force by band clamping.

SUMMARY OF THE INVENTION

In furtherance of the above-stated objective, the present invention provides a novel rotor for a revolving-flux type motor of the type having a stator including a coil wound around an iron core. The novel rotor of the invention includes permanent magnets fixed to an iron core, wherein the permanent magnets have peripheries which together form a circle when fixed to the iron core and bottoms configured to provide a flux density distribution varying in accordance with a 180° sinusoidal waveform in a circumferential direction between the stator and the rotor, and wherein the iron core has an outer peripheral configuration which allows face-contact with the bottoms of the permanent magnets.

Since the rotor for a revolving-flux type motor of the invention employs permanent magnets having arcuate peripheries which together form a circle when fixed to the iron core and bottoms which are shaped to provide a sinusoidal flux density distribution at the gap between the stator and the rotor, a band clamp of simple cylindrical shape uniformly contacts the outer peripheral surfaces of the permanent magnets, enabling automatic assembling by tightening of the band. Further, since the rotor employs an iron core having a faceted peripheral configuration which provides face-contact with the bottoms of the permanent magnets, positioning the permanent magnets can be facilitated in the assembling operation in which the permanent magnets are placed onto the rotor. By using permanent magnets and a rotor thus configured, the permanent magnets to be assembled can be increased in size without changing dimensions such as the inner diameter of the stator and the outer diameter of the rotor, so that the effective flux is increased and the performance of the motor is improved.

These and other objects and features of the invention will become more apparent from the following description of preferred embodiments with reference to the accompanying drawings.

DETAILED DESCRIPTION OF THE PREFERRED EMBODIMENTS

Figure 1A:
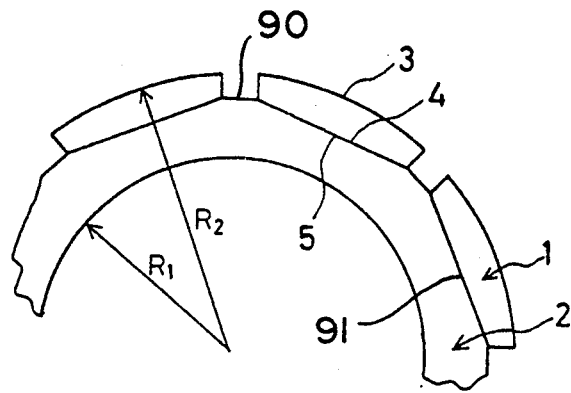
FIG. 1(a) illustrates a rotor for a revolving-flux type motor which is one embodiment of the invention.
Figure 1B:
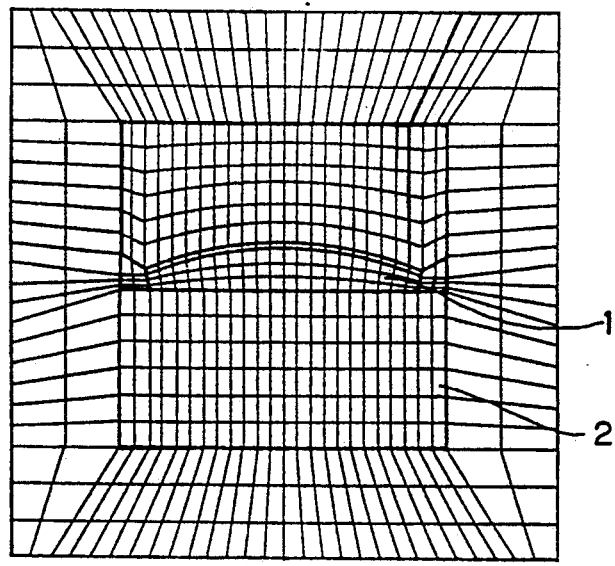
FIG. 1(b) illustrates the magnetic circuit of the rotor of FIG. 1(a)

Referring to FIGS. 1(a) and 1(b), which illustrates one embodiment of a rotor for a revolving-flux type motor, in accordance with the present invention, numeral 1 indicates permanent magnets, 2 indicates a rotor iron core, 3 indicates outer peripheries of the permanent magnets, 4 indicates bottoms of the permanent magnets, 5 indicates an outer periphery of the rotor iron core 2, and 6 indicates a stator iron core.

Figure 1C:
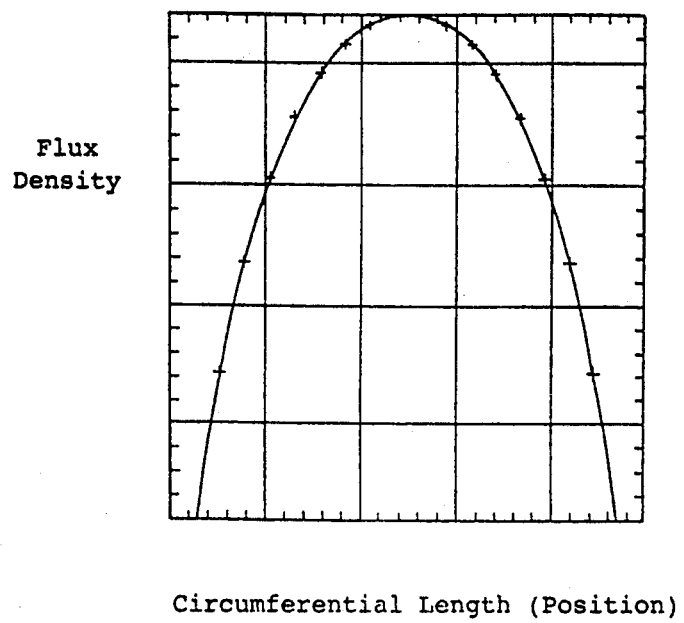
FIG. 1(c) is a graph illustrating the flux density distribution for the rotor of FIG. 1(a)

In FIGS. 1(a) and 1(b), each permanent magnet 1 has an anisotrophy parallel to the direction of the magnet poles, and is made from material containing, e.g. neodymium, iron or boron. The outer peripheries 3 of the permanent magnets 1 together define a cylindrical surface and the bottom 4 of each magnet is planar. The rotor iron core 2 is hollow, and the outer periphery 5 thereof is formed of a plurality of beveled segments 90 configured for flush contact with the magnet bottoms 4. Surface segments 91 alternate with shorter flat surface segments 90. Each bevel or surface segment 90, 91 extends across the entire width of the iron core 2. Preferably the beveled segments are substantially flat so that the rotor iron core 2 has a polygonal contour. The magnetic circuit for the structure of FIG. 1(a) is illustrated in FIG. 1(b), and the flux density distribution is illustrated in FIG. 1(c), in which the abscissa is the lateral length of the permanent magnet and the ordinate is the flux density. Gaps between the permanent magnets 1 and the stator iron core 6 are uniform. The magnets thus constructed, with unmodified arcuate outer shape and the planar inner sides, enable the form of the flux density distribution between the iron core and the permanent magnets to approach a sinusoidal waveform to an extent substantially similar to that achieved by the prior art permanent magnets having eccentric outer peripheries.

The rotor of FIG. 1(a), having a hollow iron core according to the present invention may be employed in a wheel motor provided with a reduction gear, and an example thereof will be described below.

Figure 2:
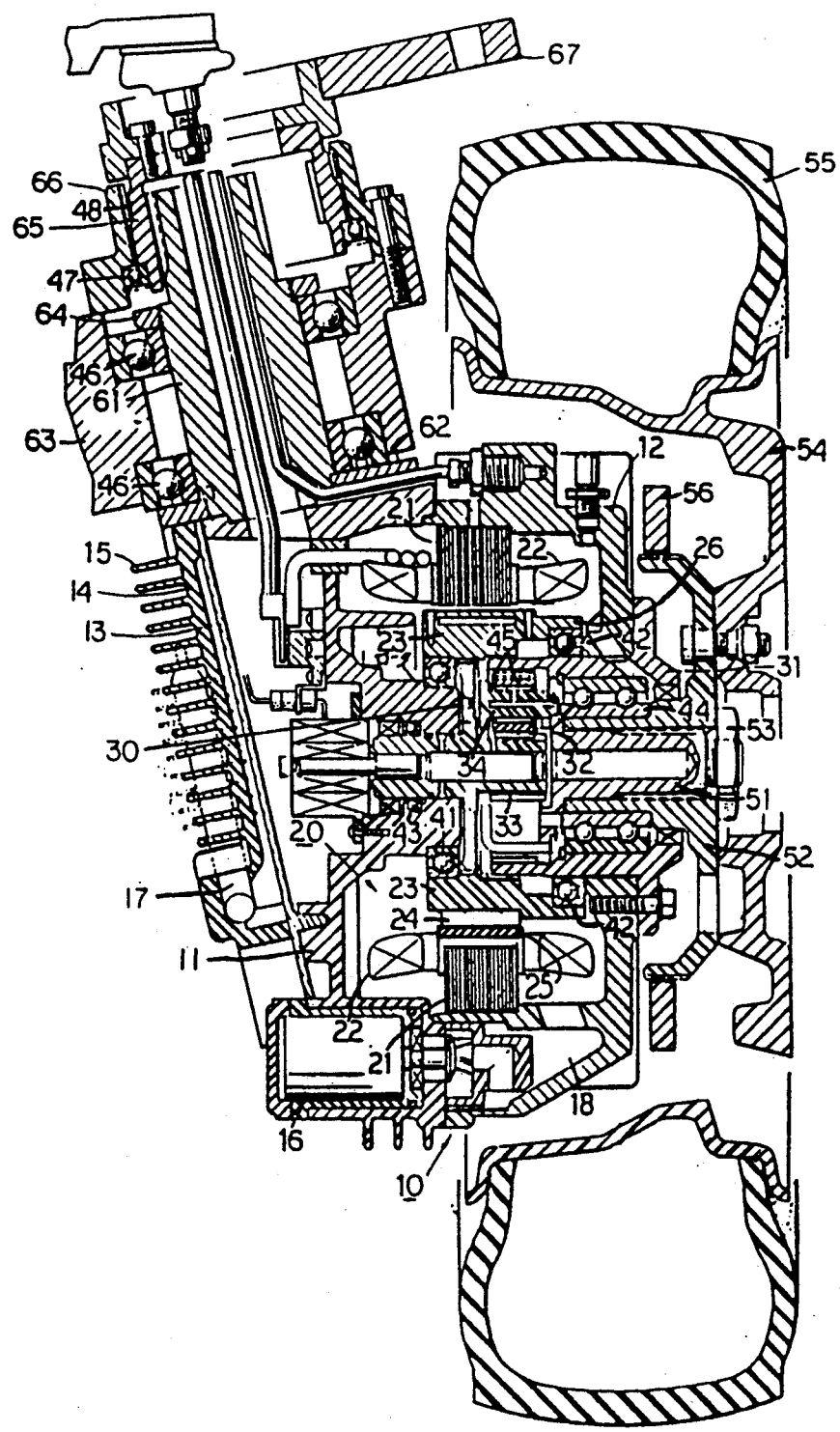
FIG. 2 is a cross-section of a wheel motor provided with a reduction gear and a rotor which has a hollow iron core.

Referring to FIG. 2, a casing assembly or main body 10 has a two-piece structure formed of a cylindrical housing 11 at the support side and a housing 12 at the wheel side, which are held together by bolts (not shown). A plate 13 and a cover 134 are held to a side of the housing 11 opposite to the wheel side housing 12 by bolts (not shown). The housing 11 is held to a support 61 by bolts 62. An oil pump motor 16 is disposed in a bottom part of the housing 11. The plate 13 and the cover 14 form an oil passage therebetween, through which oil from an oil sump 18 at the bottom flows for cooling. In order to aid in cooling the oil, the cover 14 is provided at its outer surface with a large number of cooling fins 15 and a heat pipe 17. The casing assembly 10 houses an electric motor 20 having a flat and hollow rotor 23 and an epicyclic reduction gear 30 which is accommodated in the hollow rotor 23.

The electric motor 20 has a stator 21 fixedly fitted to the inner wall of the housing 12 and a coil 22 wound around the stator 21. The rotor 23 of the electric motor 20 includes a hollow iron core around which permanent magnets 24 are fixed by a band clamp 25. The rotor 23 is also provided at one end with a thin-walled portion 26 extending from the main body of the rotor which supports the permanent magnets 24, and is rotatably supported at this thin-walled portion 26 and at the other end. In the illustrated embodiment, the above other end is supported by a ball bearing 41 fitted to the housing 11 and the above one end is supported by a ball bearing 42 fitted to a ring gear 31 of the epicyclic reduction gear 30. The ring gear 31 of the epicyclic reduction gear 30 is press-fitted into the housing 12 and is held thereto by bolts. Thus, the ring gear 31 also serves as a member at the housing 11 side for supporting the thin-walled portion 26 through the ball bearing 42, and the distance from its end to the position for supporting the ball bearing 42 is larger than the width of the opposed portions of the rotor 23 and the stator 21. When the rotor 23 is inserted from the left in FIG. 2 for assembly, the rotor 23 is guided through the ball bearing 42 by an extension of the casing assembly, i.e. the end portion of the ring gear 31. For this reason, the outer periphery of the ring gear 31 forming the guide surface is recessed to have a slightly smaller diameter.

The sun gear 33 of the epicyclic reduction gear 30 is supported by a ball bearing 43 fitted to the housing 11, and is splined into the hollow rotor 23. A pinion shaft 34 is connected to an output carrier 51 forming an output rotation shaft, and rotatably carries a pinion gear 32 through a needle bearing 45 so as to permanently mesh it with the ring gear 31 and the sun gear 33.

An output flange 52 is splined onto the output carrier 51 and is fixed against movement by a nut 53. The flange 52 is supported by the ring gear 31 through the double row angular bearing 44 located axially outside the pinion gear 32. A brake disk 56 is splined to the output flange 52, and a wheel 54 carrying a tire 55 is held thereto by bolts and nuts.

The support 61 is a cylindrical member having external teeth at its upper portion and is rotatably supported by a knuckle 63 by means of the angular bearing 46 and a nut 64 so as to bear a thrust load. An internal cover 66 is bolted to the knuckle 63. An internal gear wheel 65 having internal teeth is bolted to a steering lever 67 so that the ball bearing 47 and the needle roller bearing 48 rotatably support the internal cover 66 and the external teeth of the support 61 are meshed with the internal gear wheel 65, forming a velocity increasing gear. In these structures, as the lever 67 is moved, the internal gear wheel 65 rotates through an angle, and the support 61 rotates through an increased angle, e.g. doubled.

In the above structures, the ring gear 31 is fixed to the housing 12, inside which the double row angular bearing 44 supports the output flange 52 and the output carrier 51, and the rotor 23 of the electric motor 20 is splined to the sun gear 33 of the epicyclic reduction gear 30. Therefore, it is possible to prevent the deviation of the center of the double row angular bearing 44 and thus inclination of the shaft, resulting in high concentricity of the epicyclic reduction gear 30.

Since the epicyclic reduction gear 30 is disposed in the hollow in the rotor 23, the axial length can be reduced to form flat and compact structures, which enables high speed rotation and improved acceleration and deceleration. In this case, since the rotor has a short axis and a large diameter, the span between the two supporting points is relatively short relative to the diameter, so that deviation of the centers of the housings may cause inclination of the rotor, which causes deviation in the distance between the stator and the magnets of the rotor, resulting in variation of the torque characteristics. In answer to this potential problem, the rotor of the present invention is provided at one peripheral end portion with a wall thinner than the remainder of its outer cylindrical wall and is axially and radially supported at two points at the opposite ends of its axis. Therefore, the supporting portions have large diameters and the concentricity is increased, so that the inclination of the rotor and the variation of the space between the rotor and the stator can be reduced. Accordingly, it is possible to prevent variation of performance, which might otherwise be caused by inclination of the rotor.

Now, the assembly process for the rotor will be described below.

Figure 3A:
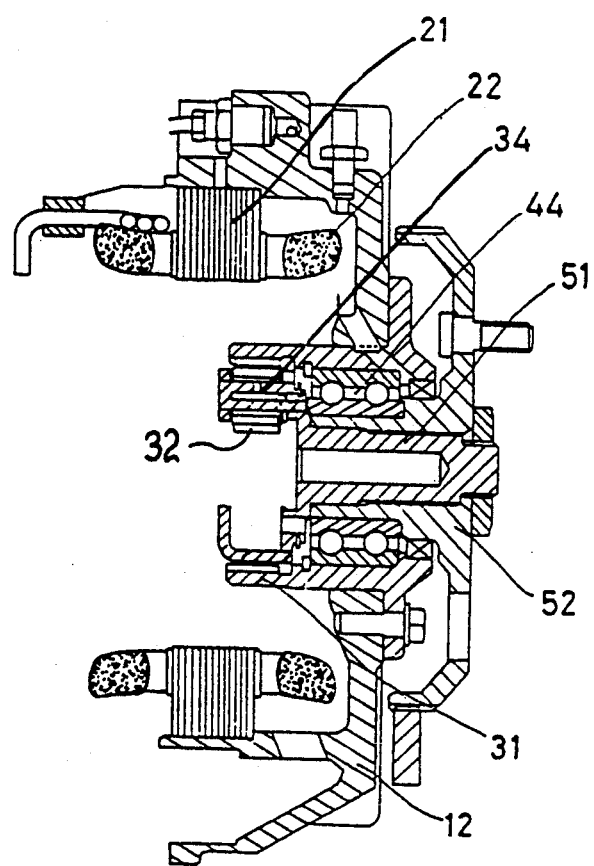
FIG. 3(a) is a cross-sectional view of the stator of the motor of FIG. 2
Figure 3B:
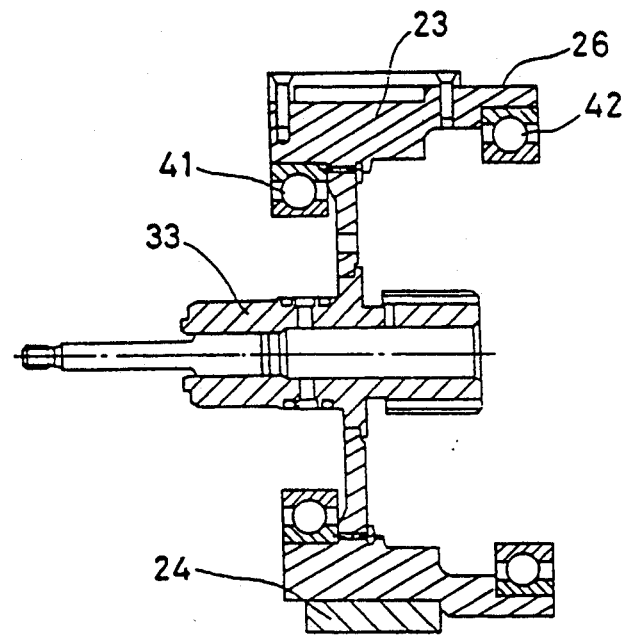
FIG. 3(b) is a cross-section of the rotor of the motor of FIG. 2.
Figure 4A:
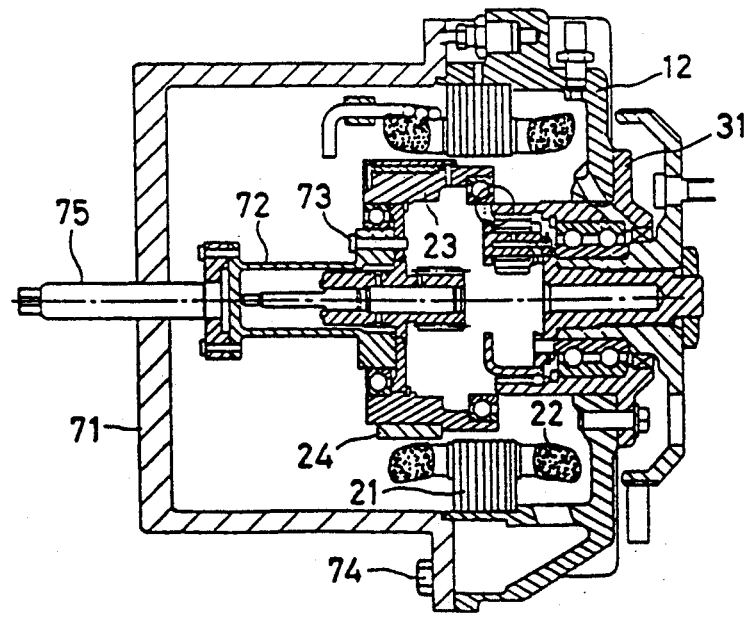
FIGS. 4(a), 4(b) and 4(c) illustrate various stages in assembly of the motor of FIG. 2.
Figure 4B:
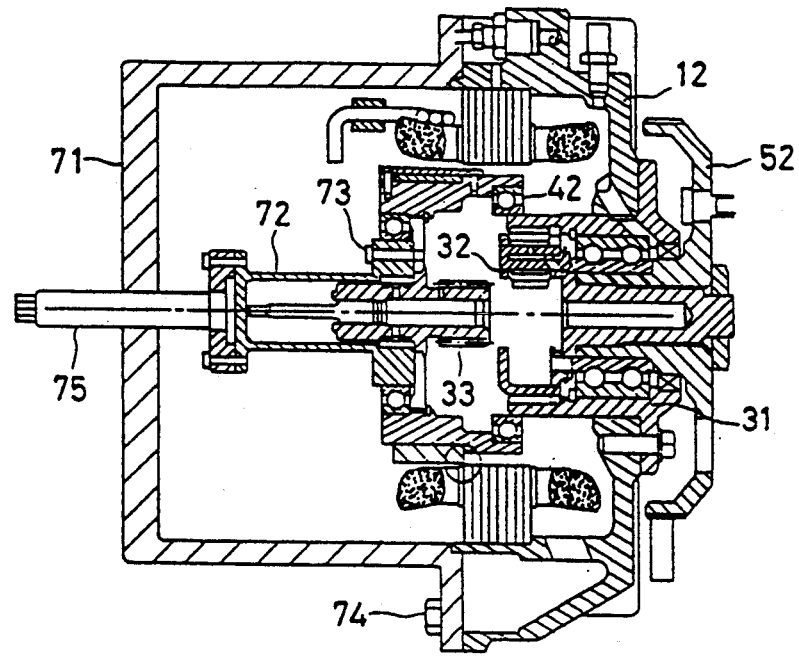
Figure 4C:
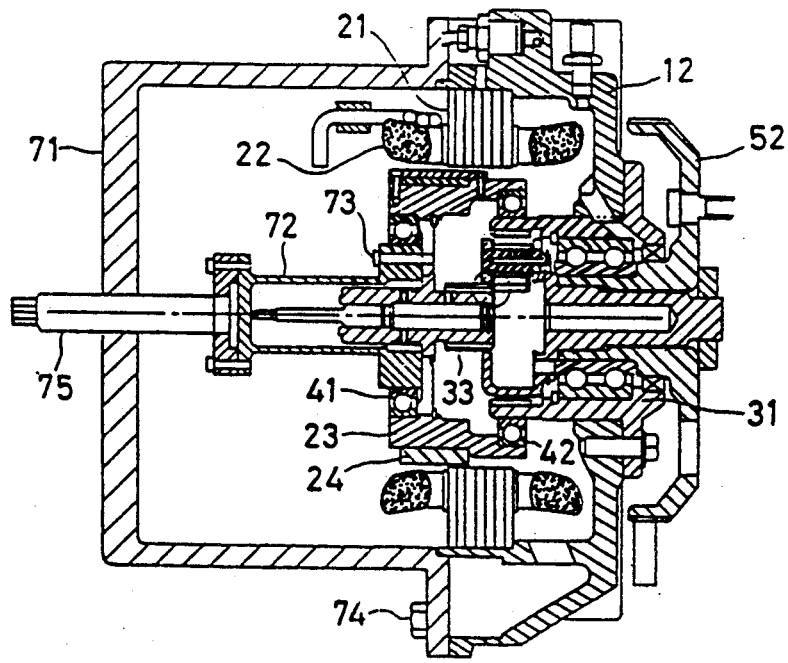
Figure 5A:
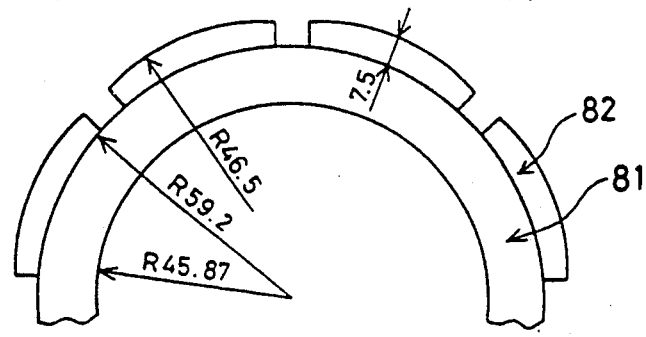
FIG. 5(a) illustrates an example of a prior art rotor for a revolving-flux type motor.
Figure 5B:
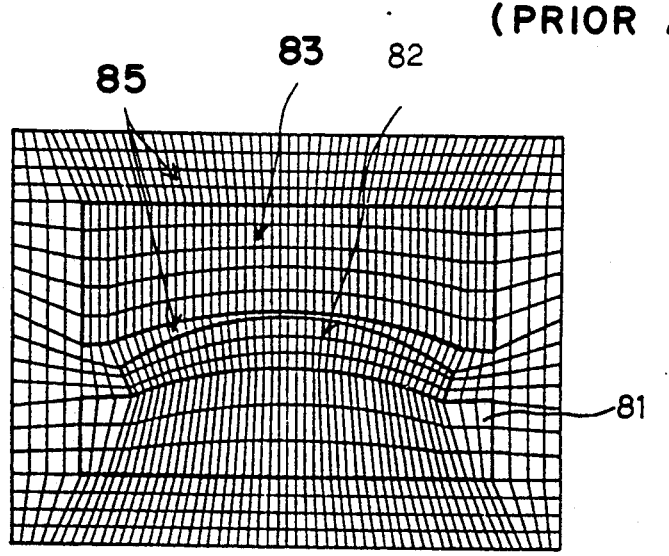
FIG. 5(b) illustrates the magnetic circuit of the rotor of FIG. 5(a)
Figure 6A:
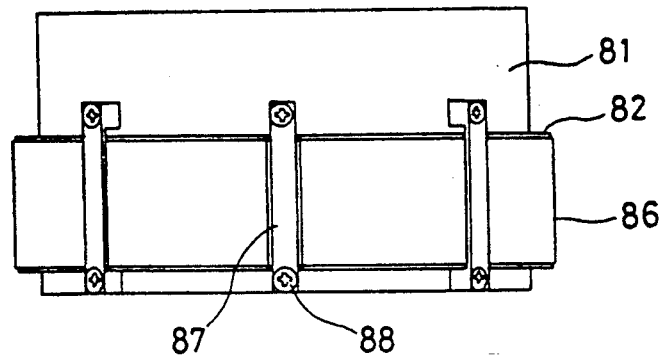
FIGS. 6(a), 6(b) and 6(c) illustrate a prior art rotor having permanent magnets held on the rotor core by a band clamp.
Figure 6B:
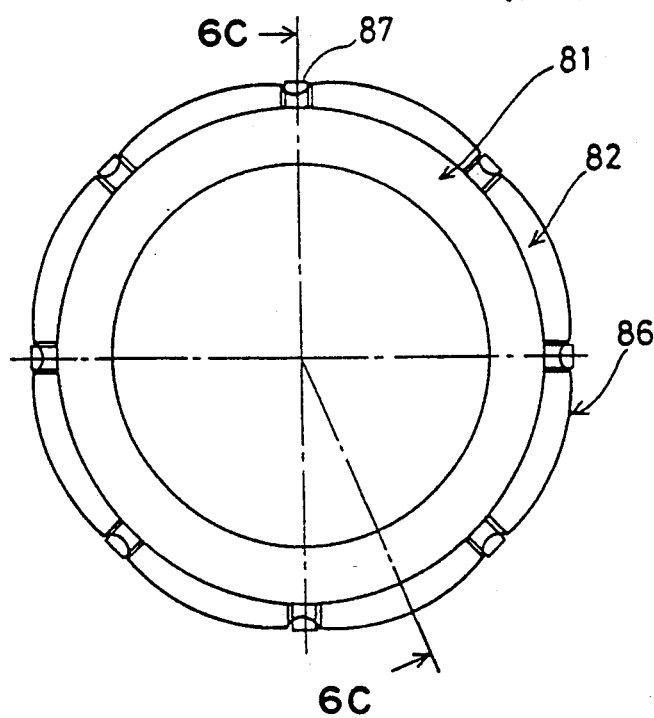
Figure 6C:
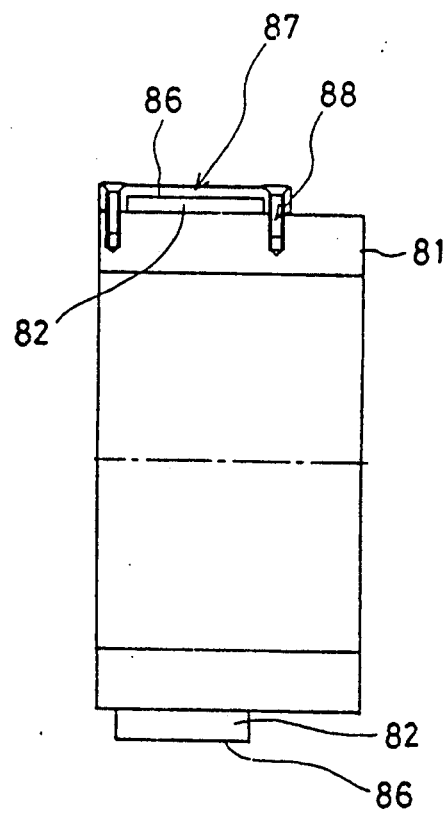

FIG. 3(a) and 3(b) illustrates structures at the stator side and the rotor side, and FIGS. 4(a), 4(b) and 4(c) illustrates stages in the assembly of the rotor.

Prior to the assembling of the rotor, the ring gear 31 and the stator 21 are press-fitted into the housing 12, as shown in FIG. 3(a), and then the pinion gear 32, double row angular bearing 44, output carrier 51, output flange 52 and others are added. In a separate process, the sun gear 33, ball bearings 41 and 42 are assembled with the rotor 23, as shown in FIG. 3(b).

Then, as shown in FIG. 4(a), an assembling jig 71 for attaching the housing 12 and an assembling jig 72 for attaching the lower assembly are used. The housing 12 and the lower assembly are attached to the assembly jigs 71 and 72 by bolts 74 and 73, respectively, and a bolt 75 is tightened to attach the assembling jig 72 to the housing 12. At an initial stage of the tightening operation of the bolt 75, the ball bearing 42 attached to the thin walled portion 26 of the rotor 23 comes in contact with the end of the ring gear 31 to guide the rotor 23, as shown in FIG. 4(a). In this stage, the permanent magnets 24 of the rotor 23 are not yet facing the stator and the sun gear is not meshed with the pinion gear.

When the bolt 75 is further tightened, the permanent magnets 24 align with the stator 21, as shown in FIG. 4(b), so that an attraction force is produced between the permanent magnets 24 and the stator iron core. However, since the rotor 23 is supported at the two points, i.e., the contact point between the ball bearing 42 and the ring gear 31 and the contact point between the assembly jib 71 and the bolt 75, the rotor 23 can be inserted while maintaining a clearance between the permanent magnets 24 and the stator 21 and preventing contact thereof.

Now as shown in FIG. 4(c), the sun gear 31 and the pinion gear 32 are meshed together, and the rotor 23 is completely assembled into the housing 12.

The invention is not restricted to the above described embodiment, and various modifications can be made. For instance, although the above embodiment employs permanent magnets having flat bottoms, the middle portions of the bottoms may be convex toward the iron core to increase the difference in thickness between the end portions and the middle portions, or may be concave. These modifications enable further approach to a sinusoidal waveform and/or control of wave height.

According to the invention, as described hereinabove, since the bottom of each magnet is not an arc shape but, rather, substantially flat, i.e. planar or near planar, and the iron core of the rotor has a corresponding polygonal contour, the assembling operation of the permanent magnets to the iron core can be facilitated and the assembled accuracy can be improved. Further, since the outer peripheries of the permanent magnets are arcuate and sectors of a circle defined by the cylindrical surface of the rotor (with permanent magnets attached), the contact area between the permanent magnets and the band clamp can be sufficiently large that band clamping can be employed using a band clamp or holder (endless band) of a material having less strength. Since the outer peripheries of the permanent magnets are arcuate the band clamp can be a simple cylindrical form, which facilitates automatic assembling and improves productivity. Permanent magnets having larger volumes can be used with the same dimensional restrictions as compared with conventional structures, so that the effective flux is increased, and the performance is improved.

Although particular preferred embodiments of the invention have been disclosed in detail for illustrative purposes, it will be recognized that variations and modifications may be made without departing from the spirit and scope of the invention as claimed.

We claim:

1. A rotor for a revolving-flux type motor provided with a stator including a coil wound around an iron core, said rotor comprising:
    an iron core having a beveled outer cylindrical surface defined by a plurality of alternating first end second flat surface segments;
    a plurality of permanent magnets, each of said permanent magnets being mounted on one of said first flat surface segments and having an arcuate outer surface and a flat inner surface, said iron core and said permanent magnets providing a magnetic flux density varying in accordance with a 180° sinusoidal waveform in a circumferential direction between said rotor and the stator, the arcuate outer surfaces of said permanent magnets together defining a circular circumference for said rotor, said first flat surface segments each providing flush contact with the inner surface of the each respective permanent magnet mounted thereon, and said second flat surface segments defining spaces between said first surface segments and between said permanent magnets; and
    a band clamp securing the plurality of permanent magnets on the iron core.

2. The rotor of claim 1 wherein said first flat surface segments are substantially longer than said second flat surface segments.

* * * * *